United States Patent [19]
Koch

[11] 3,743,313

[45] July 3, 1973

[54] LAWNMOWER AND HANDLE THEREFOR

[76] Inventor: Edward G. Koch, 716 Benton Boulevard, Kansas City, Mo. 64124

[22] Filed: Feb. 14, 1972

[21] Appl. No.: 226,136

[52] U.S. Cl............................ 280/47.37, 16/111 A
[51] Int. Cl................................................ B62b 5/06
[58] Field of Search.............................. 16/111 A; 280/47.37 R, 1.5, 5.2, 5.32, 47.34

[56] References Cited
UNITED STATES PATENTS

| | | | |
|---|---|---|---|
| 1,368,503 | 2/1921 | Kallauner.......................... | 16/111 A |
| 1,516,856 | 11/1920 | Johnson............................. | 280/1.5 |
| 854,424 | 5/1907 | Ketterer............................ | 16/111 A |
| 2,544,099 | 3/1951 | Malin............................ | 280/47.37 R |
| 1,407,690 | 2/1922 | Berry............................ | 280/47.37 R |

Primary Examiner—Kenneth H. Betts
Assistant Examiner—J. D. Rubenstein
Attorney—Claude A. Fishburn, Orville O. Gold et al.

[57] ABSTRACT

A lawnmower having a housing with wheels thereon to permit movement along a ground surface in response to a push or pull on a handle therefor and mounted on the housing and having a lower handle portion with spaced ends secured to the housing of the lawnmower and upstanding therefrom and respective arms extending from each of the spaced ends and extending substantially parallel with a direction of travel of the lawnmower and an upper handle portion having spaced ends mounted on the lower handle portion and an auxiliary upper handle portion positioned below the first named upper handle portion on each of which has a gripping portion at an upper end thereof and positioned in spaced relation.

8 Claims, 7 Drawing Figures

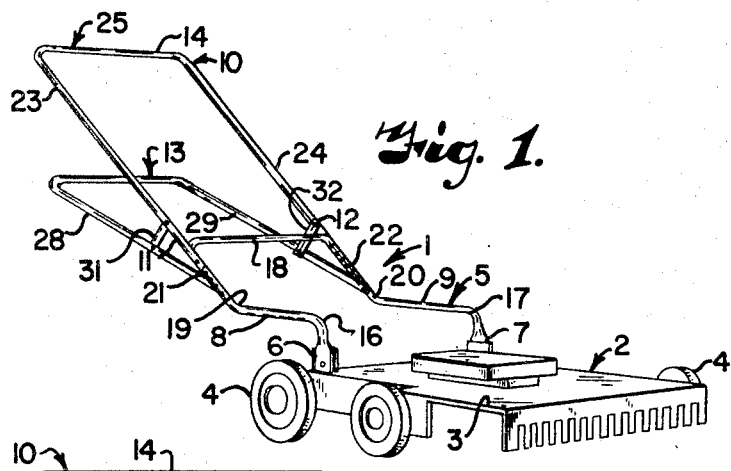
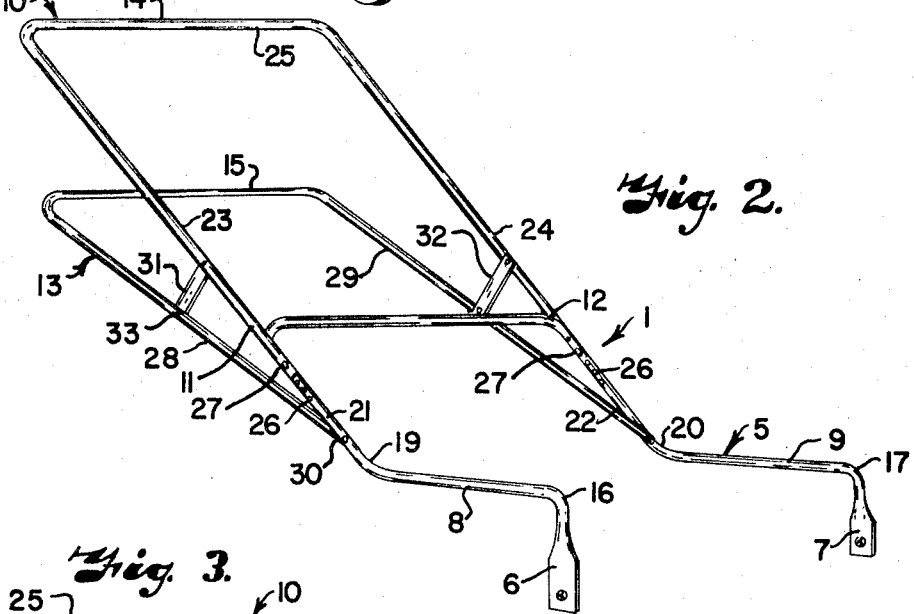
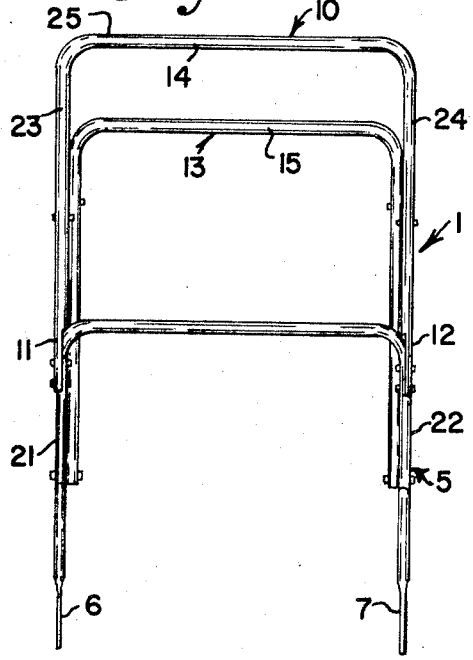
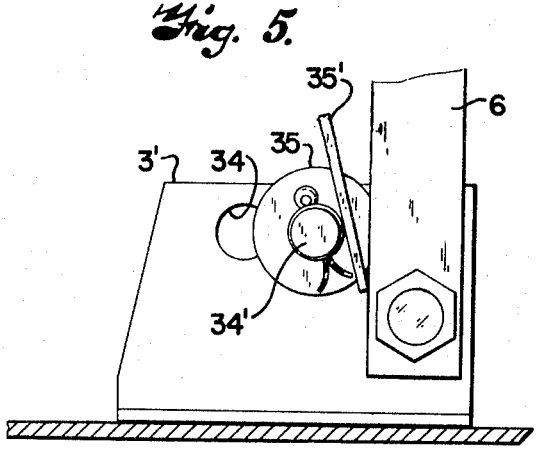

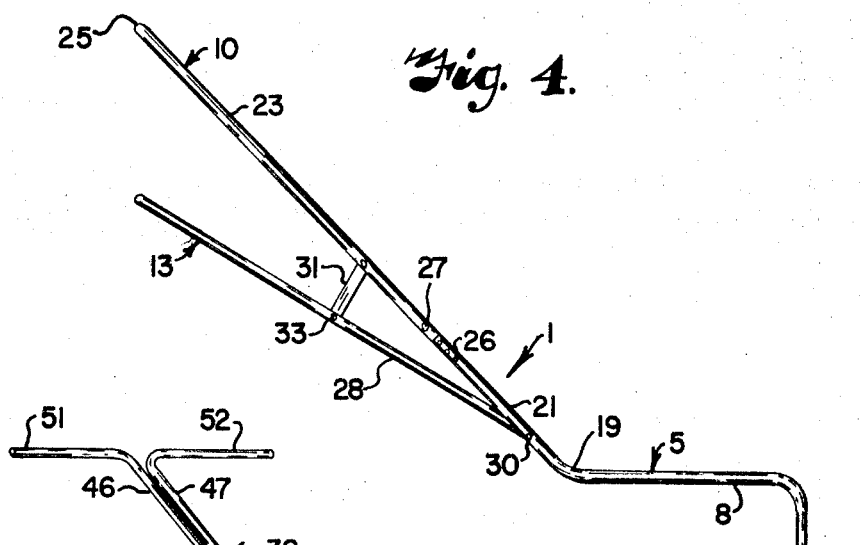
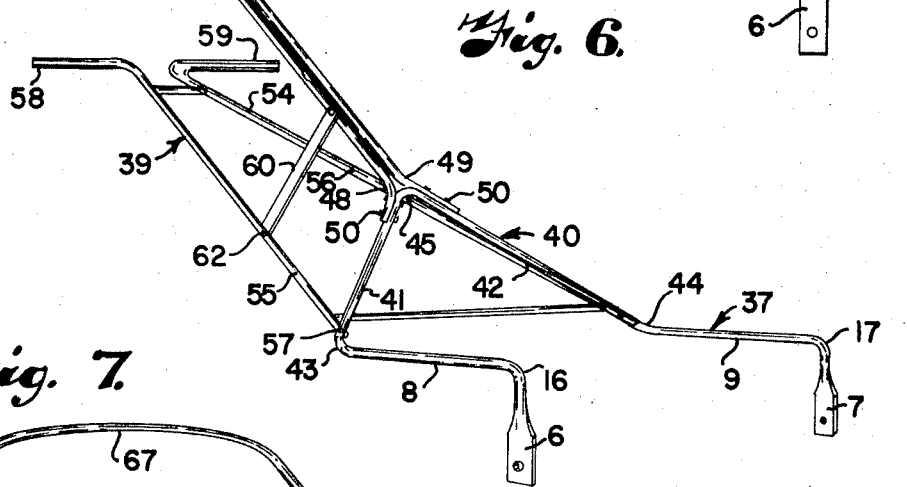
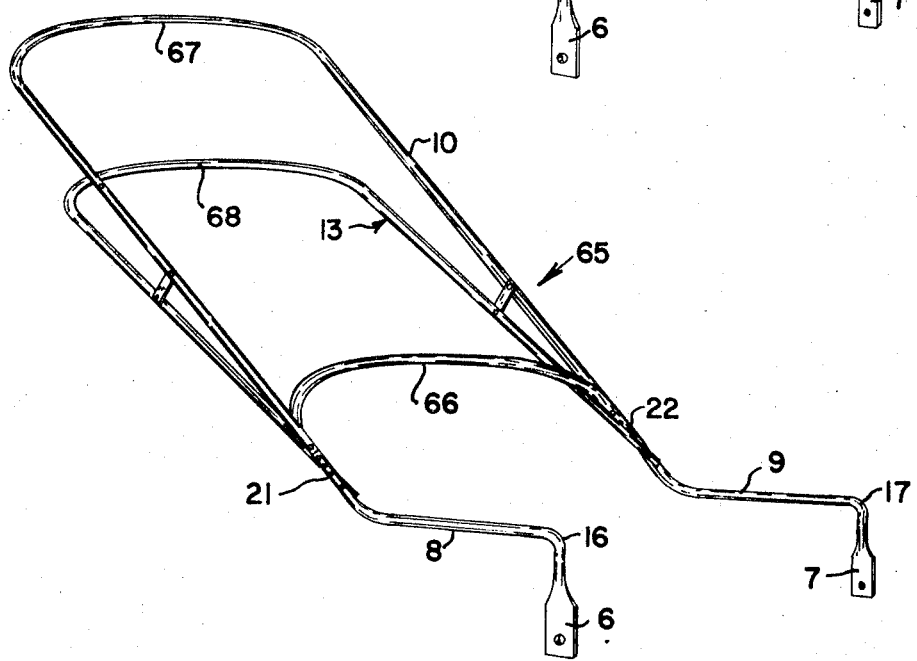

LAWNMOWER AND HANDLE THEREFOR

The present invention relates to lawnmowers and handles therefor and more particularly to a lawnmower handle having a lower handle portion with spaced ends secured to a housing of a lawnmower and upstanding therefrom and arms extending from the respective spaced ends and substantially parallel with a direction of travel of the lawnmower.

The principal objects of the present invention are: to provide an improved lawnmower handle for use with a lawnmower having a housing with wheels thereon to permit movement along a ground surface in response to a push or pull on a handle; to provide such a lawnmower handle having portions mounted on the lawnmower housing and upstanding therefrom and arms extending substantially parallel with a direction of travel of the lawnmower; to provide such a lawnmower handle having portions positioned for ease in applying pushing and pulling forces to the lawnmower; to provide such a lawnmower handle having a lower handle portion with arms extending substantially parallel with a direction of travel of the lawnmower and an upper handle portion mounted on the lower handle portion and extending upwardly therefrom and an auxiliary upper handle portion positioned below the first named upper handle portion with each having a gripping portion at an upper end thereof and positioned in spaced relation; to provide such a lawnmower handle adapted to be disassembled into a lower handle portion, an upper handle portion, and an auxiliary upper handle portion for ease in shipping; and to provide such a lawnmower handle which is economical to manufacture durable in construction, easy to assemble, easy to fold for storage, and particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include exemplary embodiments illustrating various objects and features of the lawnmower and handle therefor of the present invention.

FIG. 1 is a perspective view of the lawnmower and handle therefor embodying features of the present invention and shown mounted on a lawnmower.

FIG. 2 is an enlarged perspective view of the lawnmower handle.

FIG. 3 is a front elevational view of the lawnmower handle.

FIG. 4 is a side elevational view of the lawnmower handle.

FIG. 5 is a further enlarged fragmentary elevational view showing means for mounting the handle on the lawnmower.

FIG. 6 is a perspective view of a modified lawnmower handle.

FIG. 7 is a perspective view of another modified lawnmower handle.

Referring more in detail to the drawings:

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

In the disclosed embodiment of the present invention, the reference numeral 1 generally designates an improved lawnmower handle for use with a lawnmower 2 having a housing 3 with wheels 4 rotatably mounted thereon to permit selected movement along a ground surface (not shown) in response to a push or pull on the lawnmower handle 1 which has a lower handle portion 5 with spaced ends 6 and 7 thereof adjustably secured to the housing 3 of the lawnmower 2 and, as shown in FIG. 5, upstanding therefrom and arms 8 and 9 connected to and extending from the respective spaced ends 6 and 7 and extending substantially parallel with a direction of travel of the lawnmower 2. The lawnmower handle 1 includes an upper handle portion 10 having spaced ends 11 and 12 fixedly mounted on the lower handle portion 5 and an auxiliary upper handle portion 13 positioned below and at an angle with the first named upper handle portion 10. The upper handle portion 10 has a gripping portion 14 at an upper end thereof and the auxiliary upper handle portion 13 has a gripping portion 15 at an upper end thereof with the gripping portions 14 and 15 being in spaced relation.

The spaced ends 6 and 7 of the lower handle portion 5 are adapted to be adjustably secured to the housing 3 of the lawnmower 2, as later described. The spaced ends 6 and 7 preferably each have at least one flat surface engageable with a flat surface of a mounting bracket 3' suitably secured to the lawnmower housing 3 and in the illustrated structure, the spaced ends 6 and 7 are generally planar or flat portions upstanding from the housing 3 and substantially normal or perpendicular to the housing 3. Bends 16 and 17 connect the spaced ends 6 and 7 to the arms 8 and 9 respectively. The arms 8 and 9 extend substantially normal to the spaced ends 6 and 7 and are substantially parallel with a direction of travel of the lawnmower 2.

The lower handle portion 5 includes a connecting portion 18 extending between the arms 8 and 9 and connected thereto by bends 19 and 20 respectively. The connecting portion 18 may be any desired shape which is adapted to support the upper handle portion 10 thereon. In the illustrated structure, the connecting portion 18 is a generally U-shaped member and has side members 21 and 22 connected to the arms 8 and 9 respectively by the bends 19 and 20. The side members 21 and 22 and the arms 8 and 9 are positioned to form an angle therebetween in the range of 120° to 150°, such as 135°.

The upper handle portion 10 is illustrated as having a lower end thereof secured to the connecting portion 18 and extending upwardly therefrom. The handle portion 10 is a generally U-shaped member having side members 23 and 24 having the lower ends thereof connected to the side members 21 and 22 of the connecting portion 18 and the side members 21 and 22 of the connecting portion 18 and the side members 23 and 24 of the upper handle portion 10 are preferably co-planar and form an extension of the connecting portion 18.

It is desirable that the height of an upper end portion 25 of the upper handle portion 10 above a ground surface (not shown) be adjstable to conform to the height of a person using the lawnmower 2. Therefore, the side members 21 and 22 of the connecting portion 18 each have a plurality of spaced apertures 26 therein each adapted to receive a suitable fastening device, such as a bolt 27 having a suitable nut thereon. It may be desirable to fold the lawnmower handle 1 for storage, therefore, the fastening device 27 is loosened to permit the upper handle portion 10 to pivot about same for movement toward the lawnmower 2.

The auxiliary upper handle portion 13 is also illustrated as a generally U-shaped member and has side members 28 and 29 which may be connected to one of the lower handle portion 5 and the upper handle port on 10, however, the side members 28 and 29 of the auxiliary upper handle portion are illustrated as being suitably connected to the side members 21 and 22 respectively of the lower handle portion 5, as by a suitable fastening member, such as a bolt 30. As best seen in FIG. 3, the side members 28 and 29 are positioned inwardly of the side members 21 and 22 of the lower handle portion 5.

The auxiliary upper handle portion 13 is preferably positioned below the lower handle portion 5 and maintained in a position to define an acute angle therebetween, such as in the nature of 10° to 30°, therefore, suitable hangers 31 and 32 are suitably connected to and extend between the side members 23 and 24 of the upper handle portion 10 and the respective side members 28 and 29 of the auxiliary upper handle portion 13. In the illustrated structure, opposite ends of the hangers 31 and 32 are secured to the respective side members by suitable fastening devices, such as bolts 33.

The gripping portion 14 of the upper handle portion 10 is positioned above the gripping portion 15 of the auxiliary upper handle portion 13 and the gripping portion 15 preferably does not extend beyond the gripping portion 14 whereby the gripping portion 15 is substantially below and preferably slightly forwardly of the gripping portion 14, as best seen in FIG. 4.

FIG. 5 illustrates a mounting bracket 3' adapted to be secured on an upper surface of the housing 3 of the lawnmower 2 and to support respective spaced ends 6 and 7 of the lower handle portion 5. Suitable fastening devices, such as bolts with nuts thereon, hold the spaced ends 6 and 7 on the respective brackets and permit limited adjustment of the lawnmower handle 1 relative to the lawnmower 2.

The illustrated mounting bracket 3' has an upstanding arm or portion with a plurality of spaced apertures 34 therein which are each adapted to receive a pin 34' therein for rotatably supporting same. A flange or washer 35 is secured to the pin 34' as by welding, and a bar 35' is secured to the flange or washer 35, as by welding, and the bar 35' is positioned to be engaged by the respective ends 6 and 7 to thereby limit rearward movement thereof and support same.

The lawnmower handle 1 illustrated in FIGS. 1 to 5 inclusive is adapted to transmit a pushing or a pulling force to lawnmower 2 by means of the brackets 3' mounted on the housing 3. For operation of the lawnmower 2 over substantially level surfaces and over gentle slopes, either a pushing or pulling force is applied to the gripping portion 14 of the upper handle portion 10, as desired. For forward movement of the lawnmower 2 up or down a steep slope, the hands of a person are placed in engagement with the gripping portion 14 of the upper handle portion 10, however, for reverse movement of the lawnmower 2 up a steep slope, it is preferable for the hands of the person to be placed on the gripping portion 15 of the auxiliary upper handle portion 13 to apply a pulling force to the handle 1.

FIG. 6 illustrates a modified lawnmower handle 36 for use with the lawnmower 2 and having a modified lower handle portion 37 and a modified upper handle portion 38 connected thereto and extending upwardly therefrom and a modified auxiliary upper handle portion 39.

The modified lower handle portion 37 includes the spaced ends 6 and 7 and the arms 8 and 9 connected thereto by the bends 16 and 17 and extending substantially parallel with a direction of travel of the lawnmower 2. However, the modified lower handle portion 37 has a modified connecting portion 40 which is illustrated as a generally V-shaped member having converging side members 41 and 42 connected to the arms 8 and 9 by bends 43 and 44 respectively and the side members 41 and 42 are connected together at their respective upper ends by a bend 45.

The modified upper handle portion 38 is illustrated as including a pair of adjacent elongated members 46 and 47 having respective lower ends 48 and 49 thereof connected to the side members 41 and 42 respectively by suitable fastening devices, such as bolts 50 having suitable nuts thereon. The elongated members 46 and 47 have arms 51 and 52 at the respective upper end thereof and extending outwardly therefrom to define a gripping portion at the upper end of the modified upper handle portion 38.

The modified auxiliary upper handle portion 39 is illustrated as comprising a pair oF spaced elongated members 53 and 54 having lower ends 55 and 56 respectively suitably connected to the side members 41 and 42 of the lower handle portion 37, as by a suitable fastening device, such as a bolt 57 having a nut thereon. Arms 58 and 59 extend outwardly from an upper end of the elongated members 53 and 54 respectively and define a gripping portion at the upper end of the auxiliary upper handle portion 39. Hangers 61 and 62 have opposite ends suitably connected to the elongated members 46 and 47 and to the elongated members 53 and 54 respectively, as by fastening devices, such as bolts 62 each having nuts thereon.

FIG. 7 illustrates another modified lawnmower handle 65 which is substantially similar to the lawnmower handle illustrated in FIGS. 1 to 4 inclusive except that an upper end portion 66 of the connecting portion 18 is connected to the side members 21 and 22 by bends each having a substantially longer radius and upper end portions 67 and 68 of the upper handle portion 10 and the auxiliary upper handle portion 13 are also connected to the respective side members thereof by bends each having a substantially longer radius. The upper end portions 66, 67, and 68 are also illustrated as extending in a curvilinear path between the bends at the opposite ends thereof whereby the gripping portions for the modified upper handle portion and the modified auxiliary upper handle portion of the lawn mower handle 65 are arcuate members.

It is to be understood that while I have illustrated and described certain forms of my invention, it is not to be limited to these specific forms or arrangement of parts herein described and shown.

I claim:

1. A lawnmower handle comprising:

a. a lower handle portion having spaced ends adapted to be connected to a housing of a lawnmower and extending therefrom, said lower handle portion including:
1. generally upright portions defining the spaced ends of said lower handle portion;
2. an arm for and extending from each of said upright portions and extending substantially parallel with a direction of travel of the lawnmower;

b. an upper handle portion having spaced ends connected to said lower handle portion and extending therefrom, said upper handle portion having a gripping portion at an upper end thereof;

c. an auxiliary upper handle portion having spaced ends connected to one of said lower handle portion and said first named upper handle portion and having a gripping portion positioned in vertical spaced relation with the gripping portion of said first named upper handle portion;

d. a connecting portion extending between said arms and having said upper handle portion mounted thereon.

2. A lawnmower handle as set forth in claim 1 wherein:
a. said connecting portion is a generally U-shaped member and has a side member for and connected to each arm of said lower handle portion and extending therefrom; and
b. said side members and said respective arms of said connecting portion are positioned to form an angle therebetween in the range of 120° to 150°.

3. A lawnmower handle as set forth in claim 1 wherein:
a. said connecting portion is a generally U-shaped member and has a side member for and connected to each arm of said lower handle portion and extending therefrom;
b. said first named upper handle portion is a generally U-shaped member and has a side member for and connected to each of said side members of said connecting portion;
c. said auxiliary upper handle portion is a generally U-shaped member and has a side member for and connected to each of said side members of said lower handle portion; and
d. said first named upper handle portion and said auxiliary upper handle portion are positioned to define an acute angle therebetween.

4. A lawnmower handle as set forth in claim 3 wherein:
a. said side members of said connecting portion and said side members of said first named upper handle portion are aligned in a substantially collinear relation; and
b. said auxiliary upper handle portion is positioned below said first named upper handle portion.

5. A lawnmower handle comprising:
a. a lower handle portion having spaced ends adapted to be adjustably secured to a housing of a lawnmower and extending therefrom, said spaced ends being upstanding from the housing of the lawnmower, said lower handle portion having an arm for and extending from each of said upstanding portions and extending substantially parallel with a direction of travel of the lawnmower and a connecting portion extending between said arms and positioned to form an angle between said arms and said connection portion in the range of 120° to 150°;

b. an upper handle portion having spaced ends fixedly mounted on said connecting portion of said lower handle portion and extending therefrom, said upper handle portion having a gripping portion at an upper end thereof;

c. an auxiliary upper handle portion having spaced ends fixedly mounted on one of said lower handle portion and said first named upper handle portion and having a gripping portion positioned in vertical spaced relation with the gripping portion of said first named upper handle portion; and d. means connected to and extending between said first named upper handle portion and said auxiliary upper handle portion to maintain the respective gripping portions thereof in the vertical spaced relation.

6. A lawnmower handle as set forth in claim 5 wherein:
a. the connecting portion of said lower handle portion is a generally U-shaped member and has a side member for and connected to each arm of said lowerhandle portion and extending therefrom;
b. said side members of said connecting portion and said arms of said lower handle portion are positioned to form an angle therebetween in the range of 120° to 150°;
c. said first named upper handle portion is a generally U-shaped member and has a side member for and connected to each of said side members of said connecting portion;
d. said auxiliary upper handle portion is a generally U-shapedmember and has a side member for and connected to each of said side members of said lower handle portion;
e. said side members of said first named upper handle portion and said respective side members of said connecting portion of said lower handle portion are aligned in a substantially linear relation; and
f. said auxiliary upper handle portion is positioned below said first named upper handle portion and disposed to define an acute angle therebetween.

7. A lawnmower handle as set forth in claim 5 wherein:
a. said spaced ends of said lower handle portion are each adjustably secured to a respective mounting bracket;
b. each mounting bracket has a portion upstanding from the housing of the lawnmower;
c. the upstanding portion of each mounting bracket has a plurality of apertures therein;
d. a pin is mounted in a selected one of the apertures in each of the upstanding portions;
e. each of the pins has a flange extending therefrom; and
f. each flange has a bar fixedly mounted thereon and engagable by a respective one of said spaced ends of said lower handle portion to thereby limit movement of the lower handle portion.

8. A lawnmower and handle therefor comprising:
a. a lawnmower having a housing with wheels thereon to permit movement along a ground surface;
b. a lower handle portion having spaced ends adapted to be connected to the housing of the lawnmower and extending therefrom, said lower handle portion including:

1. generally upright portions defining the spaced ends of said lower handle portion;
2. an arm for extending from each of said upright portions and extending substantially parallel with a direction of travel of the lawnmower; and
3. a connecting portion extending between said arms;

c. an upper handle portion having spaced ends connected to said connecting portion of said lower handle portion and extending therefrom, said upper handle portion having a gripping portion at an upper end thereof; and d. an auxiliary upper handle portion having spaced ends connected to one of said lower handle portion and said first named upper handle portion and having a gripping portion positioned in vertical spaced relation with the gripping portion of said first named upper handle portion.

* * * * *